United States Patent
Turchick et al.

[11] Patent Number: 5,522,122
[45] Date of Patent: Jun. 4, 1996

[54] REMOVALBE FLASHLIGHT HOLDER FOR BICYCLE HANDLEBAR

[76] Inventors: Carmi Turchick, 236 N. Warren, Apt. 2, Tucson, Ariz. 85719; Yaël Salomon, 2540 E. 8th St., Tucson, Ariz. 85716

[21] Appl. No.: 402,625

[22] Filed: Mar. 13, 1995

[51] Int. Cl.[6] ............ B65D 63/00; F21V 33/00
[52] U.S. Cl. ............ 24/335; 24/16 PB; 24/339; 224/420; 224/436
[58] Field of Search ............ 24/335, 339, 16 R, 24/16 PB; 224/30 A, 39, 41

[56] References Cited

U.S. PATENT DOCUMENTS

| | | | |
|---|---|---|---|
| 1,735,212 | 11/1929 | Pawsat | 224/41 |
| 3,114,184 | 12/1963 | Bigaouette | 24/16 PB |
| 3,224,054 | 12/1965 | Lige | 24/16 PB |
| 3,588,964 | 6/1971 | Dudley et al. | 24/16 PB |
| 3,766,608 | 10/1973 | Fay | 24/16 PB |
| 3,827,815 | 8/1974 | Strange | 24/339 |
| 4,112,988 | 9/1978 | Nelson | 24/16 PB |
| 4,618,081 | 10/1986 | Miree | 224/41 |
| 4,910,835 | 3/1990 | Carpenter | 24/16 PB |

*Primary Examiner*—Victor N. Sakran
*Attorney, Agent, or Firm*—Antonio R. Durando

[57] ABSTRACT

A strap of stretchable material that is adapted for engagement with one end of a flashlight, wrapping around the handlebar of a bicycle, and further engagement with the other end of the flashlight, thereby securely strapping it to the handlebar. The strap includes two pairs of holes, one pair at each end, each pair including an inner hole and an outer hole. The back portion of the flashlight is first inserted through the outer and inner holes of the first pair of holes in the strap; the light is then positioned against the handlebar, the strap is wrapped around it and stretched to permit the insertion of the front portion of the flashlight into the inner hole of the second pair of holes, thereby securing the light to the handlebar. The strap is then stretched again along the length of the flashlight to insert the back portion of the light into the outer hole of the second pair of holes in the strap. The resulting link between the flashlight and the handlebar is a stable attachment with shock-absorbing characteristics that ensures proper illumination during use of the bicycle and is easily removable at will.

8 Claims, 2 Drawing Sheets

REMOVALBE FLASHLIGHT HOLDER FOR BICYCLE HANDLEBAR

BACKGROUND OF THE INVENTION

1. Field of the Invention

This invention is related in general to the field of fasteners and holders and, in particular, to a novel device and method for fastening a flashlight to the handlebar of a bicycle or similar transportation device.

2. Description of the Related Art

Bicycles and similar recreational vehicles are often not equipped with headlights for night riding. Commercial products typically require a permanent support structure to be attached to the handlebar or frame of the vehicle and a corresponding light source adapted to fit within that structure. Therefore, the process of equipping a bicycle with a commercial headlight requires dedicated hardware and a specially-designed light source. Accordingly, people often resort to makeshift holders for attaching a flashlight or other source of illumination to the handlebar or frame of the vehicle.

It would be desirable to have a device that makes it possible to reliably mount a standard flashlight to the handlebar of a bicycle without also attaching a permanent support framework to it. This invention is directed at a simple device for achieving that purpose.

BRIEF SUMMARY OF THE INVENTION

One primary goal of this invention is a method for mounting a flashlight to the handlebar of a bicycle without resorting to a structure that is permanently attached to the bicycle.

Another goal is a removable fastening device that enables the mounting of a flashlight to a handlebar.

Still another goal of the invention is a method that is suitable for use with any conventional flashlight as well as conventional bicycle handlebars.

Another objective is a durable connection that can be achieved simply and quickly.

Yet another objective is a form of coupling a flashlight to a handlebar that provides inherent shock absorption for stability during riding.

Still another objective is a method of attachment that permits a rider to divert the direction of the light beam and temporarily direct to a desired target while riding.

Another goal is the achievement of these goals with a waterproof, durable, light-weight device that is easy to carry around and store.

Finally, an objective of the invention is a device that is inexpensively manufactured from components readily available in commerce.

Therefore, according to these and other objectives, the present invention consists of a strap of stretchable material adapted for engagement with one end of a flashlight, wrapping around the handlebar of a bicycle, and further engagement with the other end of the flashlight, thereby securely strapping it to the handlebar. The strap includes two pairs of holes, one pair at each end, each pair including an inner hole and an outer hole. The back portion of the flashlight is first inserted through the outer and inner holes of the first pair of holes in the strap; the light is then positioned against the handlebar, the strap is wrapped around it and stretched to permit the insertion of the front portion of the flashlight into the inner hole of the second pair of holes, thereby securing the light to the handlebar. The strap is then stretched again along the length of the flashlight to insert the back portion of the light into the outer hole of the second pair of holes in the strap. The resulting link between the flashlight and the handlebar is a stable attachment with shock-absorbing characteristics that ensures proper illumination during use of the bicycle and is easily removable at will.

Various other purposes and advantages of the invention will become clear from its description in the specification that follows and from the novel features particularly pointed out in the appended claims. Therefore, to the accomplishment of the objectives described above, this invention consists of the features hereinafter illustrated in the drawings, fully described in the detailed description of the preferred embodiments and particularly pointed out in the claims. However, such drawings and description disclose but one of the various ways in which the invention may be practiced.

DESCRIPTION OF THE PREFERRED EMBODIMENTS OF THE INVENTION

This invention is based on the idea of utilizing a rubber strap to fasten a flashlight to a handlebar in order to achieve a quick, releasable connection. The design of the strap makes it possible to exploit its resilience and stretchability to provide shock absorption as well as secure a reliable linkage between the two structures.

Figure 1:
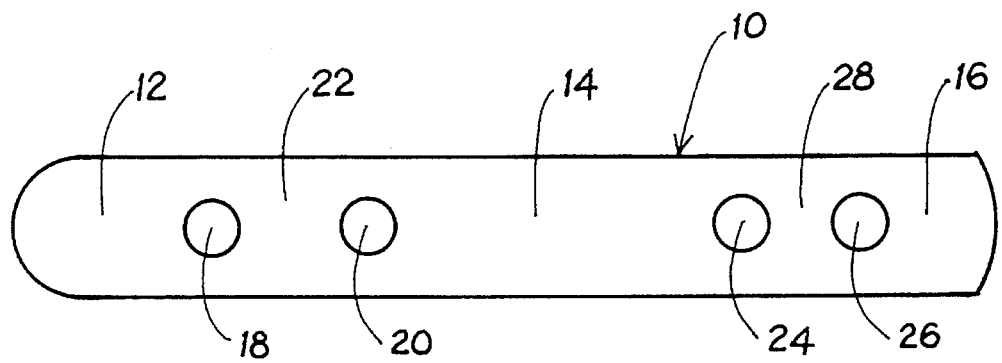
FIG. 1 is a plan view of a removable flashlight holder according to the present invention.
Figure 2:
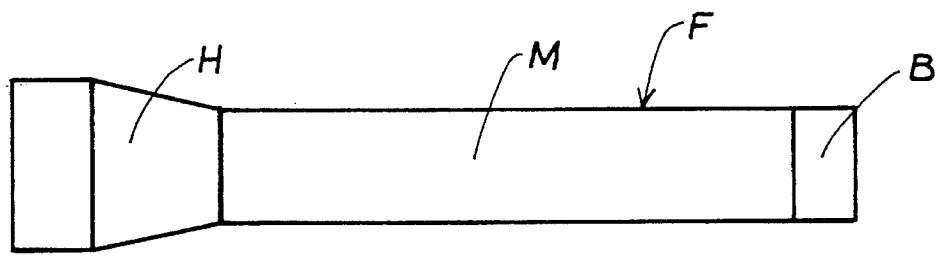
FIG. 2 is a side view of a conventional flashlight suitable for attachment to the handlebar of a bicycle using the fastening device of the invention.

Referring to the figures, wherein like parts are designated by like reference numerals and symbols, FIG. 1 illustrates the preferred embodiment of a stretchable strap 10 according to the invention. The device is described throughout this specification with reference to a conventional flashlight F having an elongated, tubular main body M with a bottom end B of substantially equal diameter, and an illuminating head H, as shown in FIG. 2. In particular, the invention is directed at providing a means for fastening to the handlebar of a road or mountain bicycle a flashlight of the type sold by Mag Instruments of Ontario, Calif., under the trademark Mini Maglite®. These lights are preferred by bicycle riders because of their rugged construction, powerful illumination, small size, and relatively light weight, all properties that make it particularly attractive for outdoors use.

The present invention consists of a strap 10 made of resilient and stretchable material, such as natural or synthetic rubber, having a front portion or tongue 12 approximately equal in length to the diameter of a conventional bicycle handlebar. The strap 10 also includes a mid portion or trunk 14 approximately equal to one half the circumference of the handlebar, and a back portion or tail 16 sufficiently long to allow a user to grab it and stretch the strap to reach the end B of the flashlight contained within it, as explained in detail below.

The strap 10 also includes two pairs of preferably-rounded perforations adapted for receiving the tubular body of the flashlight F intended for mounting on the handlebar of a bicycle or other similar vehicle. A front pair of perforations consists of an outer front hole 18 and an inner front hole 20 sufficiently spaced apart to permit folding of the front connecting portion 22 of the strap between them. A back pair of perforations consists of an inner back hole 24 and an outer back hole 26 separated by the back connecting portion 28 of the strap, the portion 28 being sufficiently long to be stretched approximately one half the length of the flashlight strapped within it, as explained below.

Figure 3:
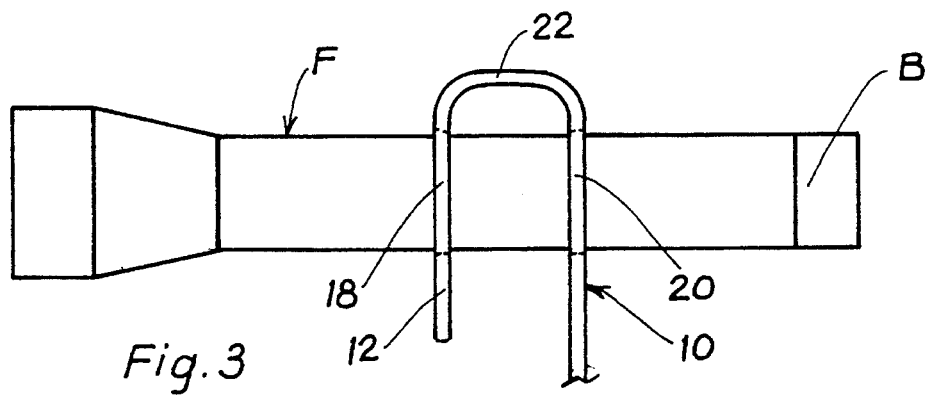
FIG. 3 is a partially cut-out side-view illustration of the first steps involved in engaging the flashlight of FIG. 2 with the strap of the invention.
Figure 4:
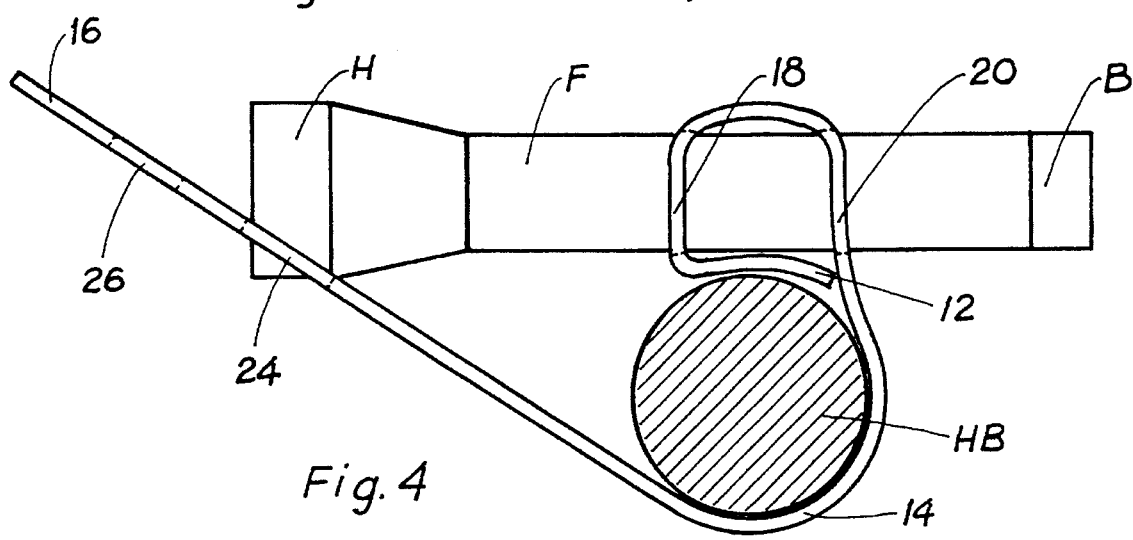
FIGS. 4–6 are side-view illustrations of the various steps involved in mounting the flashlight of FIG. 2 on a handlebar (shown in cross-section) using the strap of the invention.
Figure 5:
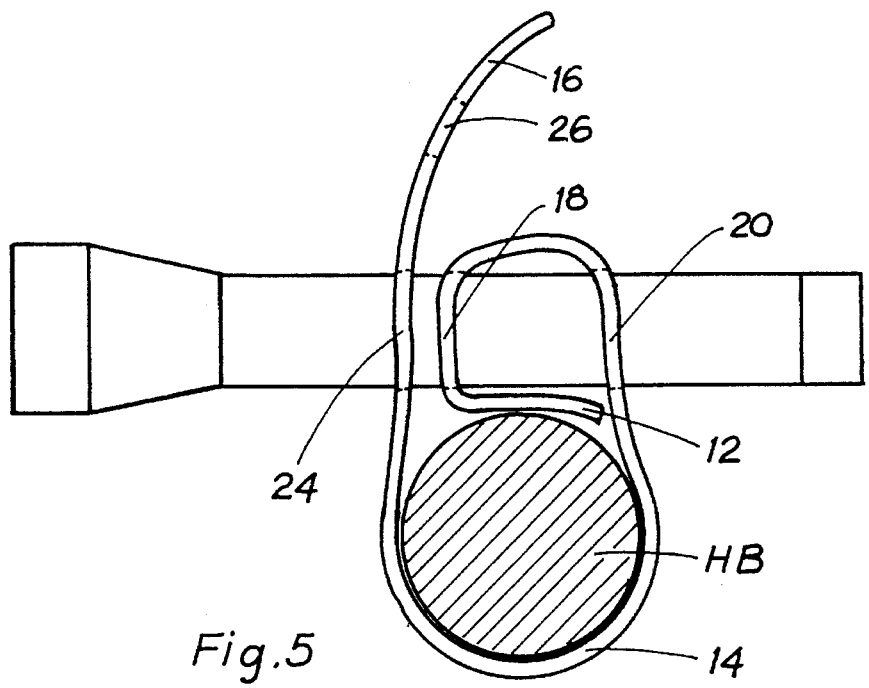
Figure 6:
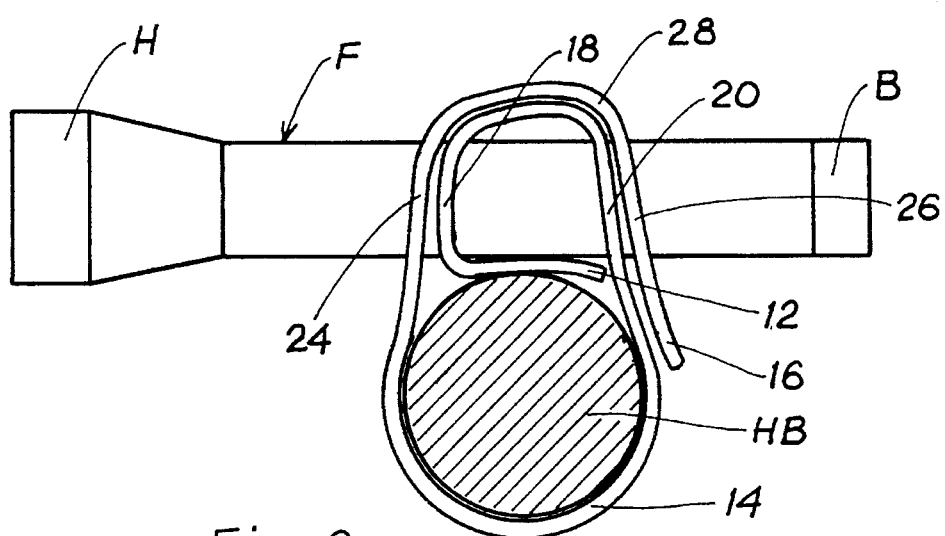

In use, the strap of the invention is first connected to the flashlight F by passing the bottom end B of the flashlight first through the outer front hole 18 and then through the inner front hole 20, thereby causing the front connecting portion 22 to be folded over the main body M of the flashlight, as illustrated in the side view of FIG. 3. The tongue 12 is then folded back and placed between the main body M of the flashlight F and the handlebar HB on which the flashlight is being mounted, as illustrated in FIG. 4, to provide a cushioning layer between the two. The mid portion 14 of the strap 10 is wrapped around the handlebar HB and stretched to permit the inner back hole 24 to reach and be passed over the head H of the flashlight, thereby securely fastening it to the handlebar, as seen in FIG. 5. Finally, the back connecting portion 28 of the strap is also stretched by pulling the tail 16 to allow the outer back hole 26 to reach and be passed over the bottom end B of the flashlight for a compact and further secured connection with the handlebar HB, as seen in FIG. 6.

The position of the flashlight F so mounted on the handlebar HB can be adjusted at will by rotating its tongue 12 and mid portion 4 over the handlebar to direct the light at a desired angle. The connection is stable because of the strap's resilience and the friction between its rubber-type material and the handlebar, which together ensure that the flashlight's desired alignment is not affected by shocks and bumps during riding, as a more rigid connection might be. In addition, the presence of the tongue 12 between the two rigid structures constituting the flashlight and the handlebar (which normally are made of metal) also provides protection against scratching or other wear that might otherwise damage either structure.

Figure 7:
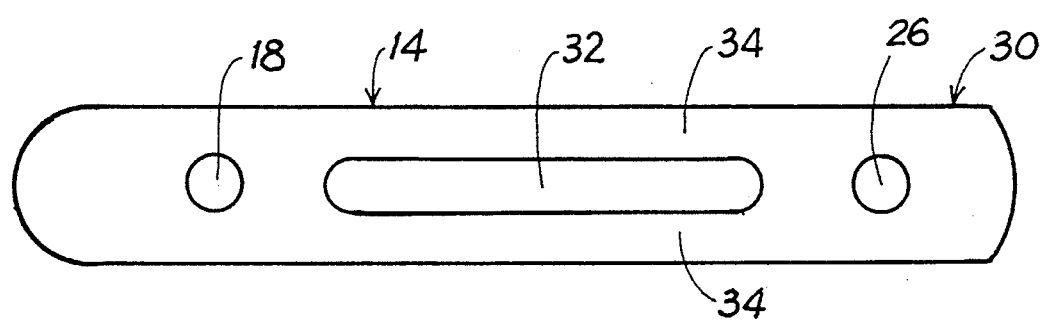
FIG. 7 is a plan view of an alternative embodiment of the strap of the invention.

Note that the outer back hole 26 is not essential for the invention. It does not provide any additional support and it is used primarily for bringing the tail 16 of the strap around the flashlight to point downward out of the way of the user. Similarly, it is noted that the two inner holes 20 and 22 could be combined in a single oblong aperture 32, as shown in the alternative embodiment 30 of FIG. 7, with equivalent results. In such case the mid portion 14 of the strap 30 consists of two parallel strips 34 used to wrap the strap around the handlebar according to the same procedure outlined above.

The preferred embodiment of the strap 10 of the invention is approximately 9 inches long (about 23 cm) and 1.5 inches wide (3.8 cm), with four holes approximately ½ inch in diameter (about 1.2 cm). The tongue 12 of the strap is about 1.5 inches long (3.8 cm), and the front connecting portion 22 is ⅜ of an inch (1.8 cm). The mid portion is about 2.5 inches long (6.4 cm) and the back connecting portion is approximately 1 inch long (2.5 cm), with a tail also about 1 inch long (2.5 cm). These dimensions are chosen to fit Mag Instruments' Mini-Maglite®, which is about 5 inches (12.6 cm) and ⅝ inches (1.6 cm) in length and diameter, respectively, and has a head approximately ⅝ inches (1.9 cm) in diameter.

This type of flashlight is turned on by rotating its head H axially about one half a turn with respect to the bottom B. Because of this feature, the flashlight may accidentally be turned on while it is being carried in a pocket by a user, which is often a problem during hikes and other outdoor excursions. The strap of the invention provides a simple tool for also solving this problem by threading the bottom end B through at least one hole at one end of the strap and the head H through at least one hole at the other end, thereby connecting the two ends with an elastic tie that prevents them from easily rotating enough to turn the flashlight on.

Various changes in the details, steps and components that have been described may be made by those skilled in the art within the principles and scope of the invention herein illustrated and defined in the appended claims. For example, a strap for a larger flashlight could readily be designed by increasing the size of the various parts of the strap in proportion to the dimensions given here and in conformance with the functional objectives described in this specification.

Therefore, while the present invention has been shown and described herein in what is believed to be the most practical and preferred embodiments, it is recognized that departures can be made therefrom within the scope of the invention, which is not to be limited to the details disclosed herein but is to be accorded the full scope of the claims so as to embrace any and all equivalent processes and products.

We claim:

1. A device for fastening a substantially-tubular flashlight to a handlebar of a bicycle, wherein said flashlight has a head, a bottom end and a predetermined length and said handlebar has a predetermined diameter and a corresponding predetermined circumference, said device comprising:

a stretchable strap including a front portion, a mid portion, and a back portion; said strap comprising a pair of front holes disposed between said front and mid portions and sufficiently separated to permit folding of the strap therebetween; a first back hold disposed between said mid and back portions of the strap; and a second back hole disposed between said mid and back portions of the strap;

wherein said front portion is at least as long as approximately said predetermined diameter of the handlebar; said mid portion is approximately as long as one half the circumference of the handlebar; each of said pair of front holes is sufficiently large to pass over said bottom end of the flashlight; said first back hole is sufficiently large to pass over said head of the flashlight; and said second back hole is sufficiently large to pass over said bottom end of the flashlight and is separated from said first back hole by a connecting portion of strap sufficiently long to be stretchable to about one half said predetermined length of the flashlight.

2. The device of claim 1, wherein said stretchable strap is approximately 9 inches long and 1.5 inches wide, said holes are approximately ½ inch in diameter, said front portion of the strap is about 1.5 inches long, said mid portion is about 2.5 inches long, and said connecting portion is approximately 1 inch long.

3. The device of claim 2, wherein said strap is made of a material selected from the group consisting of natural rubber and synthetic rubber.

4. The device of claim 1, wherein said strap is made of a material selected from the group consisting of natural rubber and synthetic rubber.

5. A device for fastening a substantially-tubular flashlight to a handlebar of a bicycle, wherein said flashlight has a head, a bottom end and a predetermined length and said handlebar has a predetermined diameter and a corresponding predetermined circumference, said device comprising:

a stretchable strap including a front portion, a mid portion, and a back portion; said strap comprising a front hole disposed between said front and mid portions, an oblong mid hole disposed within said mid portion and sufficiently separated from the front hole to permit folding of the strap therebetween, and a back hole disposed between said mid and back portions of the strap;

wherein said front portion is at least as long as approximately said predetermined diameter of the handlebar; said mid portion is approximately as long as one half the circumference of the handlebar; said front hole is sufficiently large to pass over said bottom end of the flashlight; said oblong mid hole is approximately as long as the mid portion of the strap and sufficiently large to pass over said head of the flashlight; and said back hole is sufficiently large to pass over said bottom end of the flashlight and is separated from said oblong mid hole by a connecting portion of strap sufficiently long to be stretchable to about one half said predetermined length of the flashlight.

6. The device of claim 5, wherein said strap is made of a material selected from the group consisting of natural rubber and synthetic rubber.

7. A method of fastening a substantially-tubular flashlight to a handlebar of a bicycle, wherein said flashlight has a head, a bottom end and a predetermined length and said handlebar has a predetermined diameter and a corresponding predetermined circumference, the method comprising the following steps:

(a) providing a stretchable strap including a front portion, a mid portion, and a back portion; said strap comprising a pair of front holes disposed between said front and mid portions and sufficiently separated to permit folding of the strap therebetween; a first back hole disposed between said mid and back portions of the strap; and a second back hole disposed between said mid and back portions of the strap; wherein said front portion is at least as long as approximately said predetermined diameter of the handlebar; said mid portion is approximately as long as one half the circumference of the handlebar; each of said pair of front holes is sufficiently large to pass over said bottom end of the flashlight; said first back hole is sufficiently large to pass over said head of the flashlight; and said second back hole is sufficiently large to pass over said bottom end of the flashlight and is separated from said first back hole by a connecting portion of strap sufficiently long to be stretchable to about one half said predetermined length of the flashlight;

(b) connecting said strap to the flashlight by passing said bottom end through said pair of front holes;

(c) placing said front portion of the strap between the flashlight and the handlebar;

(d) wrapping said mid portion of the strap around the handlebar and stretching it to permit said first back hole to reach and be passed over the head of the flashlight, thereby securely fastening the flashlight to the handlebar; and (e) stretching said connecting portion of the strap by pulling the back portion thereof and passing said second back hole over the bottom end of the flashlight.

8. The device of claim 7, wherein said strap is made of a material selected form the group consisting of natural rubber and synthetic rubber.

* * * * *

UNITED STATES PATENT AND TRADEMARK OFFICE
CERTIFICATE OF CORRECTION

PATENT NO. : 5,522,122
DATED : June 4, 1996
INVENTOR(S) : Turchick et al.

It is certified that error appears in the above-indentified patent and that said Letters Patent is hereby corrected as shown below:

Column 4, claim 1, line 43, replace the word "hold" with --hole--.

Signed and Sealed this

Third Day of September, 1996

Attest:

BRUCE LEHMAN

Attesting Officer     Commissioner of Patents and Trademarks